(12) United States Patent
Tang

(10) Patent No.: US 8,336,783 B2
(45) Date of Patent: Dec. 25, 2012

(54) POLYMERIC THREAD WITH MINIATURE PATTERN AND FLUORESCENT TAGGANT FOR ANTI-COUNTERFEIT APPLICATIONS AND METHOD OF MAKING SAME

(75) Inventor: Shu Tuen Tang, Hong Kong (HK)

(73) Assignee: George Monemvasitis, Neutral Bay (AU)

( * ) Notice: Subject to any disclaimer, the term of this patent is extended or adjusted under 35 U.S.C. 154(b) by 246 days.

(21) Appl. No.: 12/857,586

(22) Filed: Aug. 17, 2010

(65) Prior Publication Data

US 2011/0253791 A1    Oct. 20, 2011

Related U.S. Application Data

(60) Provisional application No. 61/325,808, filed on Apr. 19, 2010.

(51) Int. Cl.
*G06K 19/02* (2006.01)

(52) U.S. Cl. .................................................. 235/488
(58) Field of Classification Search .............. 235/488, 235/492, 487, 491; 428/394, 395; 427/290
See application file for complete search history.

(56) References Cited

U.S. PATENT DOCUMENTS

| 7,858,953 B2 * | 12/2010 | Hughes et al. ............. 250/459.1 |
| 2002/0014470 A1 * | 2/2002 | Okada et al. ..................... 216/24 |
| 2006/0199023 A1 * | 9/2006 | Funagi et al. .................. 428/458 |

FOREIGN PATENT DOCUMENTS

| JP | 2007164649 A * | 6/2007 |
| WO | 2006086889 | 8/2006 |

* cited by examiner

Primary Examiner — Seung Lee

(57) ABSTRACT

A polymeric thread includes a transparent polymeric substrate; a first patterned layer with a miniature pattern disposed at a side of the polymeric substrate; and a first florescent layer containing a florescent taggant disposed at a side of the patterned layer that is facing away from the polymeric substrate. An authentication tag utilizing the polymeric thread and a method for making the polymeric thread are also provided.

20 Claims, 3 Drawing Sheets

POLYMERIC THREAD WITH MINIATURE PATTERN AND FLUORESCENT TAGGANT FOR ANTI-COUNTERFEIT APPLICATIONS AND METHOD OF MAKING SAME

CROSS-REFERENCE TO RELATED APPLICATION

This application claims benefit of U.S. provisional application No. 61/325,808 filed on Apr. 19, 2010, the entire content of which is hereby incorporated by reference.

FIELD OF THE PATENT APPLICATION

The present application generally relates to anti-counterfeit technologies and more specifically to a polymeric thread with a miniature pattern and a fluorescent taggant for anti-counterfeit applications and a method of making the same.

BACKGROUND

Technologies have been proposed to defeat or reduce the counterfeiting and parallel importing of products. Most of them contain one or more protection features that are recognizable either by the customer's bare eyes or by a special tool. These measures can be classified into the following types or levels of security. Level 1 involves features that can be recognized overtly with bare eyes of the product's end customers. Technologies such as holograms and marks by optically variable ink (OVI) belong to this group. In the hologram case, one is looking for a specially designed holographic pattern, and in the OVI case the marked pattern will show different colors when being viewed at different angles. Level 2 involves covert or semi-covert features that require a simple and easily obtainable detection device, such as UV/IR (up-conversion) ink in banknotes. In this case one needs only a UV lamp or IR laser pen for verification. When appropriate waveband is illuminated onto the UV/IR ink, it will emit visible light and this can be observed readily by bare eyes. Level 3 involves features that are known only to the brand manufacturer and are verifiable by dedicated tools that cannot be obtained commercially in the market. This kind of authentication method usually requires higher cost of implementation and is not commonly known in the anti-counterfeit market.

The level 1 methods are overtly known by product customers as well as by counterfeiters. They may be easily repeated. The level 2 methods are less obvious and can be hidden in some special area that only manufacturer knows. However once they are known to the counterfeiters, materials with similar characteristics may be readily obtainable in the market, such as common UV/IR security inks. Conventional product authentication methods are mainly level 1 and 2 methods. The methods at level 3 have the highest level of security. First of all, they use special material or blending of materials. Secondly, specially designed analyzing tools are needed for verification. Thirdly, a proprietary algorithm is used for final product authentication which will generally include a confidential database.

SUMMARY

The present patent application is directed to a polymeric thread with a miniature pattern and a fluorescent taggant for anti-counterfeit applications and a method of making the same. In one aspect, the present patent application provides a polymeric thread. The polymeric thread includes a transparent polymeric substrate; a first patterned layer with a miniature pattern disposed at a side of the polymeric substrate; and a first florescent layer containing a florescent taggant disposed at a side of the patterned layer that is facing away from the polymeric substrate.

The polymeric thread may further include a reflective layer disposed at a side of the polymeric substrate that is facing away from the first patterned layer. The reflective layer includes metallic materials.

The polymeric thread may further include a second florescent layer containing a florescent taggant disposed at a side of the polymeric substrate that is facing away from the first patterned layer.

The polymeric thread may further include a second patterned layer with a miniature pattern disposed at a side of the polymeric substrate that is facing away from the first patterned layer. The polymeric thread may further include a second florescent layer containing a florescent taggant disposed at a side of the second patterned layer that is facing away from the polymeric substrate.

The polymeric thread may further include an additional layer disposed at a side of the polymeric substrate that is facing away from the first patterned layer, or at a side of the first florescent layer that is facing away from the first patterned layer, the additional layer being of unique optical or magnetic characteristics.

The polymeric substrate may be made of a transparent polyester material. The transparent polyester material may be polypropylene, polyethylene, polyurethane, or polycarbonate.

The minimum feature size of the miniature pattern on the first patterned layer may be equal to or less than 0.1 millimeter. The miniature pattern on the first patterned layer includes a one-dimensional code or a two-dimensional matrix code. The florescent taggant in the first florescent layer may be capable of being stimulated by ultraviolet or infrared light and thereby emitting visible light.

In another aspect, the present patent application provides an authentication tag. The authentication tag includes a barcode layer and an authentication thread layer overlapped with each other, the barcode layer including a barcode, the authentication thread layer including a polymeric thread, the polymeric thread including a transparent polymeric substrate; a first patterned layer with a miniature pattern disposed at a side of the polymeric substrate; and a first florescent layer containing a florescent taggant disposed at a side of the patterned layer that is facing away from the polymeric substrate.

The authentication thread layer may be disposed on top of the barcode layer. The barcode in the barcode layer is a one-dimensional barcode or a two-dimensional barcode. The barcode layer may include a plurality of barcodes arranged one after another in a row or spaced from each other. The authentication thread layer may include a plurality of polymeric threads arranged one after another in a row or spaced from each other.

In yet another aspect, the present patent application provides a method for making a polymeric thread. The method includes making a master microfilm with a miniature pattern; transferring the miniature pattern from the master microfilm onto photo sensitive polymeric films; slitting the polymeric films into polymeric threads of sub-millimeter width; and adding a fluorescent coating containing a fluorescent taggant onto the polymeric threads so that each of the polymeric thread includes: a transparent polymeric substrate; a first patterned layer with the miniature pattern disposed at a side of the polymeric substrate; and a first florescent layer containing the florescent taggant disposed at a side of the patterned layer that is facing away from the polymeric substrate.

The step of transferring the miniature pattern from the master microfilm onto photo sensitive polymeric films may include multiple exposures so as to achieve monochrome patterns of different colors or colored patterns.

The fluorescent coating may be added before or after the slitting process. The florescent taggant added to the polymeric threads may be capable of being stimulated by ultraviolet or infrared light and thereby emitting visible light.

The method may further include adding metallic, magnetic, polarizing or birefringent coatings to the polymeric threads.

DETAILED DESCRIPTION

Reference will now be made in detail to a preferred embodiment of the polymeric thread with a miniature pattern and a fluorescent taggant for anti-counterfeit applications disclosed in the present patent application, examples of which are also provided in the following description. Exemplary embodiments of the polymeric thread with a miniature pattern and a fluorescent taggant for anti-counterfeit applications disclosed in the present patent application are described in detail, although it will be apparent to those skilled in the relevant art that some features that are not particularly important to an understanding of the polymeric thread with a miniature pattern and a fluorescent taggant for anti-counterfeit applications may not be shown for the sake of clarity.

Furthermore, it should be understood that the polymeric thread with a miniature pattern and a fluorescent taggant for anti-counterfeit applications disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

The polymeric security thread to be described here contains both level two and level three features. The miniature patterns or words can only be observed with the use of a microscope (level two feature) and the special fluorescent feature can be identified and authenticated by a dedicated scanner with well designed hardware and software (level three feature).

Figure 1:
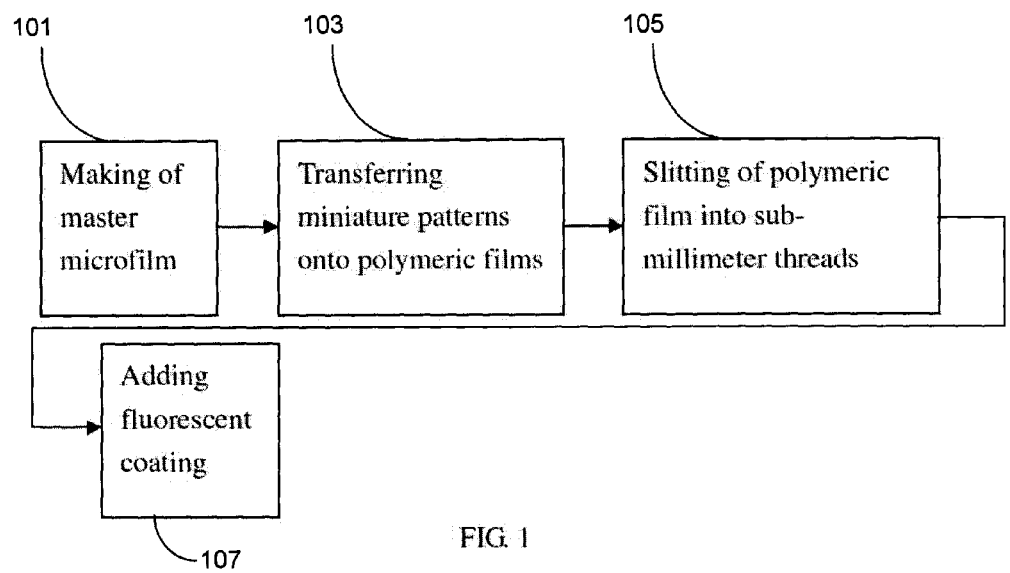
FIG. 1 illustrates a process for making a polymeric thread according to an embodiment of the present patent application.

The process of making of a polymeric thread according to an embodiment of the present application is illustrated in FIG. 1. Referring to FIG. 1, the process includes: making a master microfilm with a miniature pattern (Step 101); transferring the miniature pattern from the master microfilm onto photo sensitive polymeric films (Step 103); slitting the polymeric films into threads of sub-millimeter width (Step 105); and adding a fluorescent coating onto the threads (Step 107).

1. Master Microfilm

By using a digital microfilm maker, miniature patterns, words, logos or even two dimensional barcodes can be formed on a small film. Repeated patterns with minimum feature size less than 0.1 mm can be made. Special techniques have been employed to increase the pattern resolution so that unauthorized duplication is made difficult.

2. Roll to Roll Polymeric Films

By using the microfilm obtained from the Step 101 as the master, miniature patterns can be transferred from the master onto polymeric films with photo sensitive coatings. This is a roll to roll process for rapid mass production. After proper exposure and developing processes, rolls of polymeric films that duplicate the master patterns can be obtained. Monochrome (of different colors) or colored patterns may be obtained by using multiple exposure techniques.

3. Slitting of Films

The films are then cut into threads of sub-millimeter width. Every thread usually contains several rows of repeated words or logos.

4. Adding Fluorescent Taggants

Fluorescent taggants may be mixed with appropriate adhesives and are then coated onto the polymeric threads. In practice, the fluorescent coating may be added before or after the slitting process. The fluorescent taggants in the fluorescent coating can be stimulated by UV/IR light and thereby emit visible light.

5. Additional Processes

Metallic, magnetic, polarizing and birefringent coatings may be added to the polymeric threads, the use of which will be described in more detail hereafter.

Figure 2:
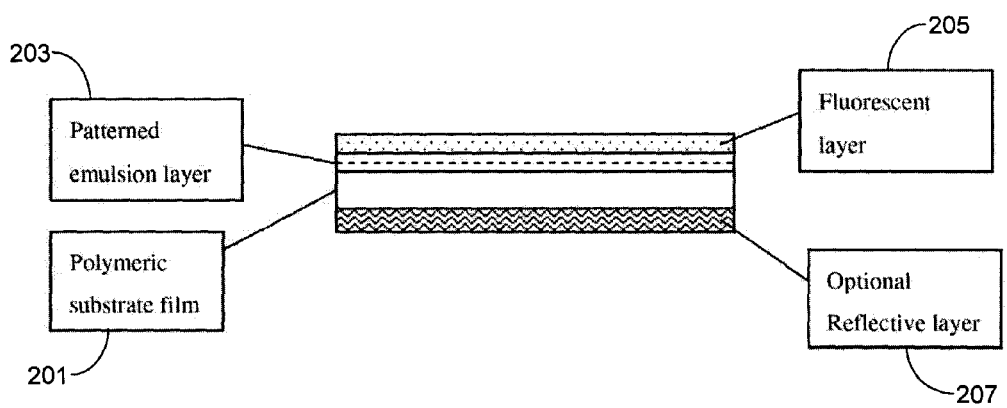
FIG. 2 illustrates a layer structure of a polymeric thread according to another embodiment of the present patent application.

FIG. 2 illustrates a layer structure of the polymeric thread according to an embodiment of the present application. Referring to FIG. 2, the structure includes a polymeric substrate film 201, a patterned emulsion layer 203 disposed at a side the polymeric substrate film 201, a florescent layer 205 disposed at a side of the patterned emulsion layer 203 that is facing away from the polymeric substrate film 201, and an optional reflective layer 207 underneath the polymeric substrate film 201.

The polymeric substrate film 201 may be made by transparent polyester materials such as polypropylene, polyethylene, polyurethane, polycarbonate and etc. The minimum feature size of the pattern on the patterned emulsion layer 203 is equal to or less than 0.1 mm The pattern on the patterned emulsion layer 203 can be a one-dimensional code, or a two-dimensional matrix code. The reflective layer 207 may be made of metallic materials and function to produce a shiny thread and enhance the fluorescent emission detection.

It is noted that in this embodiment, an additional florescent layer may be disposed between the polymeric substrate film 201 and the reflective layer 207. An additional layer that has unique optical or magnetic characteristics may be disposed on one or two sides of the outermost layers of the above-mentioned layer structure so as to enhance the anti-counterfeit features. For example, the additional layer may be aforementioned magnetic, polarizing or birefringent coatings. In that case, the authentication tool required can be a magnetic scanner or a polarized-light microscope.

In another embodiment of the present patent application, two patterned emulsion layers are disposed respectively at the two sides of the polymeric substrate film, two florescent layers are disposed respectively at two sides of the patterned emulsion layers, and two additional layers having unique optical or magnetic characteristics are disposed respectively at two sides of the florescent layers.

Anti-counterfeit is the primary objective of the polymeric security thread in the above embodiments. By adding the polymeric security thread into commercial commodities, it functions as an authentication object of the commodity. The security polymeric thread can be part of an adhesive security label for bottles and cans. The security polymeric thread can also be weaved into garment labels because the security thread itself as a long thread by structure is well suitable for working as a textile thread and being weaved onto a piece of cloth such as a woven label. The security thread can thus be integrated with a woven label and function to protect the woven label's authenticity. The fluorescent layer that acts as a buffer can effectively enhance the heat resistance of the polymeric substrate especially during ironing. It can also be overlaid to barcodes (1D or 2D) to avoid direct copy of barcodes for illegal duplications, which will be described in more detail hereafter.

Figure 3:
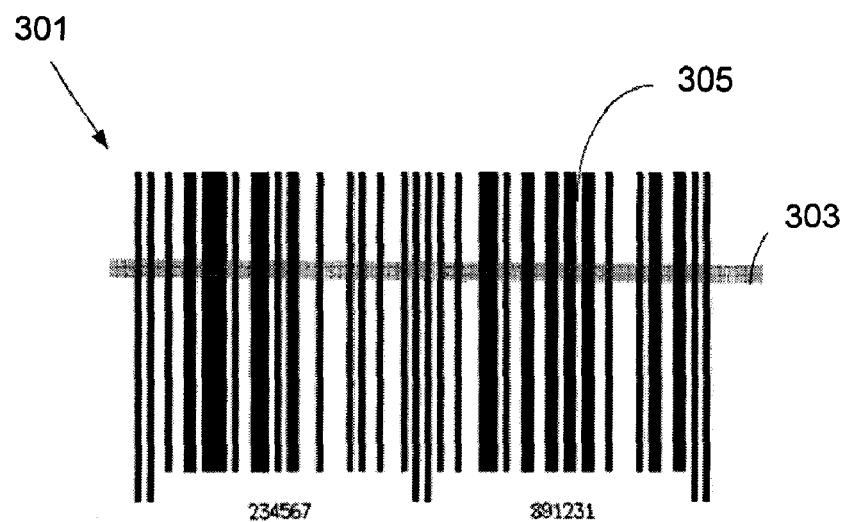
FIG. 3 shows an authentication tag including a one-dimensional bar code and a polymeric thread according to yet another embodiment of the present patent application.
Figure 4:
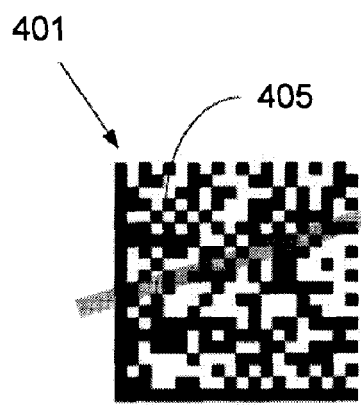
FIG. 4 shows an authentication tag including a two-dimensional bar code and a polymeric thread according to still another embodiment of the present patent application.
Figure 5:
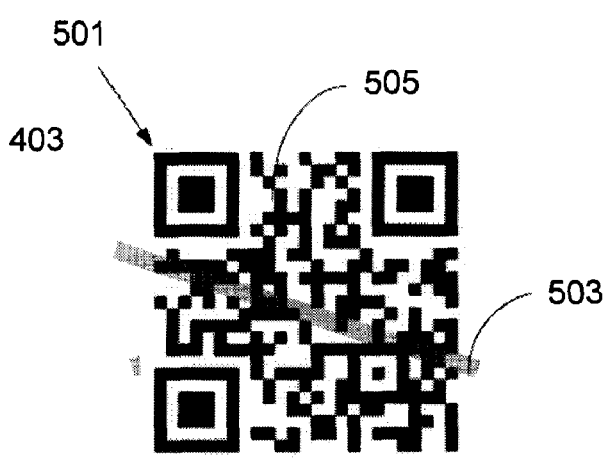
FIG. 5 shows an authentication tag including another two-dimensional bar code and a polymeric thread according to still another embodiment of the present patent application.

FIG. 3 shows an authentication tag including a one-dimensional bar code and a polymeric thread according to yet another embodiment of the present patent application. FIG. 4 shows an authentication tag including a two-dimensional bar code and a polymeric thread according to still another embodiment of the present patent application. FIG. 5 shows an authentication tag including another two-dimensional bar code and a polymeric thread according to still another embodiment of the present patent application. Referring to FIGS. 3-5, the authentication tag includes a barcode layer (305, 405 and 505) and an authentication thread layer (303, 403 and 503) overlapped with each other. By adding the authentication thread layer to the barcode layer, the authentication tag cannot be easily reproduced by photocopy.

In the embodiments illustrated by FIGS. 3-5, the authentication thread layers are disposed on top of the barcode layer. Alternatively, the barcode layer may be disposed on top of the authentication thread layer. The barcode layer (305, 405 and 505) includes at least a barcode. The authentication thread layer (303, 403 and 503) includes at least a polymeric thread as described in aforementioned embodiments. In the embodiments illustrated by FIGS. 3-5, the barcode layer (305, 405 and 505) includes a single barcode and the authentication thread layer (303, 403 and 503) includes a single polymeric thread. The polymeric thread may be disposed at an arbitrary angle with respect to the barcode. The barcode may be of a various type such as a one-dimensional barcode (as in FIG. 3), a two-dimensional barcode (as in FIG. 4 and FIG. 5), or a third-dimensional barcode. It is understood that when the barcode layer includes a plurality of barcodes, the plurality of barcodes may include a single type of barcodes, or multiple types of barcodes. In that case, the plurality of barcodes may be arranged one after another in a row or spaced from each other. It is further understood that when the authentication thread layer includes multiple polymeric threads, the multiple polymeric threads may be arranged one after another in a row or spaced from each other.

Figure 6:
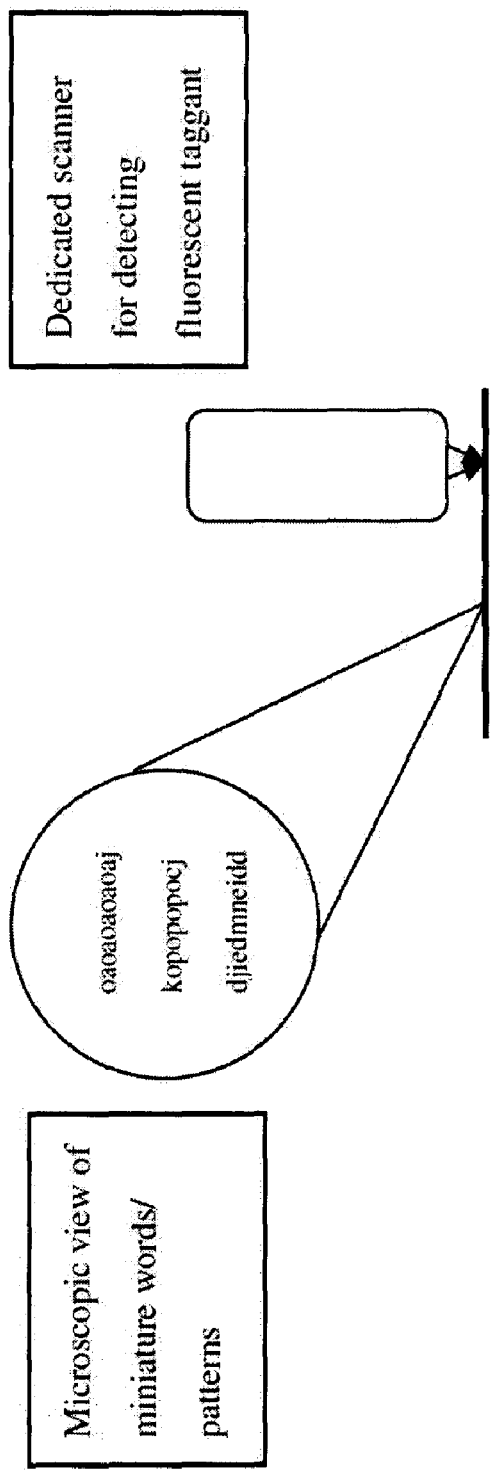
FIG. 6 illustrates the working of an authentication tool for authenticating a polymeric thread according to still another embodiment of the present patent application.

FIG. 6 illustrates the working of an authentication tool for authenticating a polymeric thread according to still another embodiment of the present patent application. Referring to FIG. 6, the authentication tool for authenticating the miniature patterns and words can be a handheld optical microscope with 40× magnification power. For the fluorescent features, dedicated equipment with appropriate excitation source is required. A common option is UV or IR light illumination. The detector may be a filtered light sensor or a spectrophotometer of appropriate working bandwidth.

The polymeric threads described in the above embodiments are capable of providing authentication in multiple levels. When the polymeric thread is configured on a product, a visual identification of the polymeric thread forms a first level of authentication. Through a handheld optical microscope, the texts or images patterned in the patterned emulsion layer of the polymeric thread may be identified so as to form a second layer of authentication. If the pattern on the patterned emulsion layer includes two-dimensional matrix codes, reading and recognizing the two-dimensional matrix codes requires the use of a specialized decoding device for two-dimensional matrix codes, which forms a third level of authentication. When illuminating the polymeric thread with appropriate light source, often a UV/IR light source, the fluorescent taggants in the polymeric thread will emit visible light that can be observed by bear eyes, which forms a fourth level of authentication. Furthermore, an analysis can be made to the spectrum of the visible light emitted by the fluorescent taggants in the polymeric thread and thereby to determine whether the spectrum fits a spectrum profile that is stored in a spectrum database. Such determination forms a fifth level of authentication.

While the present patent application has been shown and described with particular references to a number of embodiments thereof, it should be noted that various other changes or modifications may be made without departing from the scope of the present invention.

What is claimed is:

1. A polymeric thread comprising: a transparent polymeric substrate; a first patterned layer with a miniature pattern disposed at a side of the polymeric substrate; and a first florescent layer containing a florescent taggant disposed at a side of the patterned layer that is facing away from the polymeric substrate.

2. The polymeric thread of claim 1 further comprising a reflective layer disposed at a side of the polymeric substrate that is facing away from the first patterned layer, the reflective layer comprising metallic materials.

3. The polymeric thread of claim 1 further comprising a second florescent layer containing a florescent taggant disposed at a side of the polymeric substrate that is facing away from the first patterned layer.

4. The polymeric thread of claim 1 further comprising a second patterned layer with a miniature pattern disposed at a side of the polymeric substrate that is facing away from the first patterned layer.

5. The polymeric thread of claim 4 further comprising a second florescent layer containing a florescent taggant disposed at a side of the second patterned layer that is facing away from the polymeric substrate.

6. The polymeric thread of claim 1 further comprising an additional layer disposed at a side of the polymeric substrate that is facing away from the first patterned layer, or at a side of the first florescent layer that is facing away from the first patterned layer, wherein the additional layer being of unique optical or magnetic characteristics.

7. The polymeric thread of claim 1, wherein the polymeric substrate is made of a transparent polyester material.

8. The polymeric thread of claim 7, the transparent polyester material is polypropylene, polyethylene, polyurethane, or polycarbonate.

9. The polymeric thread of claim 1, wherein the minimum feature size of the miniature pattern on the first patterned layer is equal to or less than 0.1 millimeter.

10. The polymeric thread of claim 1, wherein the miniature pattern on the first patterned layer comprises a one-dimensional code or a two-dimensional matrix code.

11. The polymeric thread of claim 1, wherein the florescent taggant in the first florescent layer is capable of being stimulated by ultraviolet or infrared light and thereby emitting visible light.

12. An authentication tag comprising a barcode layer and an authentication thread layer overlapped with each other, the barcode layer comprising a barcode, the authentication thread layer comprising a polymeric thread, the polymeric thread comprising: a transparent polymeric substrate; a first patterned layer with a miniature pattern disposed at a side of the polymeric substrate; and a first florescent layer containing a florescent taggant disposed at a side of the patterned layer that is facing away from the polymeric substrate.

13. The authentication tag of claim 12, wherein the authentication thread layer is disposed on top of the barcode layer.

14. The authentication tag of claim 12, wherein the barcode in the barcode layer is a one-dimensional barcode or a two-dimensional barcode.

15. The authentication tag of claim 12, wherein the barcode layer comprises a plurality of barcodes arranged one after another in a row or spaced from each other, and the authentication thread layer comprises a plurality of polymeric threads arranged one after another in a row or spaced from each other.

16. A method for making a polymeric thread comprising: making a master microfilm with a miniature pattern; transferring the miniature pattern from the master microfilm onto photo sensitive polymeric films; slitting the polymeric films into polymeric threads of sub-millimeter width; and adding a fluorescent coating containing a fluorescent taggant onto the polymeric threads so that each of the polymeric thread comprises: a transparent polymeric substrate; a first patterned layer with the miniature pattern disposed at a side of the polymeric substrate; and a first florescent layer containing the florescent taggant disposed at a side of the patterned layer that is facing away from the polymeric substrate.

17. The method of claim 16, wherein the step of transferring the miniature pattern from the master microfilm onto photo sensitive polymeric films comprises multiple exposures so as to achieve monochrome patterns of different colors or colored patterns.

18. The method of claim 16, wherein the fluorescent coating may be added before or after the slitting process.

19. The method of claim 16, wherein the florescent taggant added to the polymeric threads is capable of being stimulated by ultraviolet or infrared light and thereby emitting visible light.

20. The method of claim 16 further comprising: adding metallic, magnetic, polarizing or birefringent coatings to the polymeric threads.

* * * * *